United States Patent
Bhagwan et al.

(10) Patent No.: US 8,489,578 B2
(45) Date of Patent: Jul. 16, 2013

(54) SYSTEM AND METHOD FOR ADMINISTERING DATA INGESTERS USING TAXONOMY BASED FILTERING RULES

(75) Inventors: Varun Bhagwan, San Jose, CA (US); Rajesh M. Desai, San Jose, CA (US); Piyoosh Jalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 12/254,647

(22) Filed: Oct. 20, 2008

(65) Prior Publication Data

US 2010/0114895 A1    May 6, 2010

(51) Int. Cl.
*G06F 17/40* (2006.01)
*G06Q 30/02* (2012.01)
*G06Q 50/00* (2012.01)

(52) U.S. Cl.
CPC ............... *G06Q 30/02* (2013.01); *G06Q 50/01* (2013.01)
USPC ........................................................ 707/710

(58) Field of Classification Search
CPC .................................................... G06Q 30/02
USPC ........................................................ 707/710
See application file for complete search history.

(56) References Cited

U.S. PATENT DOCUMENTS

| | | | |
|---|---|---|---|
| 6,311,194 B1 * | 10/2001 | Sheth et al. ................... | 715/236 |
| 6,418,433 B1 * | 7/2002 | Chakrabarti et al. ................. | 1/1 |
| 6,772,180 B1 | 8/2004 | Li et al. | |
| 6,910,049 B2 | 6/2005 | Fenton et al. | |
| 7,379,932 B2 * | 5/2008 | Agrawal et al. ............... | 707/710 |
| 7,610,285 B1 * | 10/2009 | Zoellner et al. ........................ | 1/1 |
| 7,680,773 B1 * | 3/2010 | Acharya et al. ............... | 707/737 |
| 2002/0099700 A1 * | 7/2002 | Li ..................................... | 707/5 |
| 2002/0138487 A1 * | 9/2002 | Weiss et al. ..................... | 707/10 |
| 2002/0194161 A1 * | 12/2002 | McNamee et al. ................. | 707/2 |
| 2004/0236858 A1 | 11/2004 | Schwartz | |
| 2005/0086206 A1 * | 4/2005 | Balasubramanian et al. .... | 707/3 |
| 2006/0112110 A1 | 5/2006 | Maymir-Ducharme et al. | |
| 2007/0143263 A1 * | 6/2007 | Agrawal et al. ................... | 707/3 |
| 2008/0140626 A1 * | 6/2008 | Wilson .............................. | 707/3 |
| 2008/0228675 A1 * | 9/2008 | Duffy et al. ..................... | 706/10 |

OTHER PUBLICATIONS

McCown et al., Evaluation of Crawling Policies for a Web-Repository Crawler, HT'06, Aug. 22-25, 2006, Odense, Denmark, pp. 1-11.*
Gruhl et al., The Web Beyond Popularity, World Wide Web Conference Committee (IW3C2), May 2006, Edinburgh, Scotland.
Mukherjee, Enterprise Search: Tough Stuff, Queue, Apr. 2004.
Sarawagi et al., Cross-Training: Learning Probabilistic Mappings Between Topics, SIGKDD, 2003, Washington, DC.
Chakrabarti et al., Automatic Resource list Compilation by Analyzing Hyperlink Structure and Associated Text (1998) in proceedings of the 7th International World Wide Web Conference.
Chakrabarti et al., Focused crawling: a new approach to topic specific web resource discovery. In WWW-8, 1999.

(Continued)

*Primary Examiner* — Cheyne Ly
(74) *Attorney, Agent, or Firm* — Lieberman & Brandsdorfer, LLC

(57) ABSTRACT

A method, system, and article are provided for management of a data ingester and associated content collected by the data ingester. The computer system is configured with a taxonomy together with rules and policies for ingesting and classifying the collected data. Based upon the classification of the collected data with respect to the taxonomy, the data is assigned to a location in the taxonomy.

18 Claims, 3 Drawing Sheets

OTHER PUBLICATIONS

Rennie, Using Reinforcement Learning to Spider the Web Efficiently, 1999.

Ester, Ariadne: a focused crawler with adaptive classification of the hyperlinks. In National Symposium. on Machine Learning (FGML '2000), Birlinghoven, 2000.

Diligenti et al., Focused Crawling using Context Graphs, 2000.

Aggarwal et al., Intelligent crawling on the world wide web with arbitrary predicates, Hong Kong, 2001.

Craswell et al., Effective site finding using link anchor information, Proceedings of the 24th annual international ACM SIGIR conference on Research and development in information retrieval, p. 250-257, Sep. 2001, New Orleans, Louisiana, United States.

Eiron et al, Analysis of anchor text for web search, Proceedings of the 26th annual international ACM SIGIR conference on Research and development in information retrieval.

Srinivasan et al., A General Evaluation Framework for Topical Crawlers, 2002.

* cited by examiner

SYSTEM AND METHOD FOR ADMINISTERING DATA INGESTERS USING TAXONOMY BASED FILTERING RULES

BACKGROUND OF THE INVENTION

1. Technical Field

This invention relates to data ingesters and management of data collected by the data ingesters. More specifically, the invention pertains to employing a taxonomy for classifying ingested content and applying rules to filter ingested content based upon the taxonomy.

2. Description of Related Art

A data ingester is a program or script which collects content from data repositories. It browses locations within a distributed computer network in a methodical and automated manner. The goal of an ingester is to collect data from data sources. The processing of collected data is known in two forms, the first is a continuous collection process, and the second is responsive to a specific query or request. With respect to the continuous process, the ingester continues to collect new data and refresh old data. In general, a broad set of rules are applied to the ingester to control which locations it is allowed to visit. These rules include a set of allow rules and a set of forbid rules, and the rules are employed to attempt to ensure that the ingester visits only intended location, directories, pages, and sites. In a distributed computer network, such as the Internet, there is continual growth of locations and sites, which in itself leads to an increasing challenge to the ingester.

When data sources change the type of content being served, changes to the ingester are required to maintain appropriate data collection. Other solutions for addressing changes to content require the ingester to react to changes in ingestion requirements, discovery of new data source, and changes in the nature of the data sources over time. For example, new content servers may come on-line and old content servers are either removed or modified. An ingester that consumes data from the content server ensures that their data ingestion policies take into account the new content servers. More specifically, the ingester ensures the desired content continues to be ingested, no undesired content proceeds through the ingestion process, and any new content-type is handled seamlessly and as intended.

One problem encountered in the related art is determining which data sources should be ingested and which data sources should be discarded. A known solution is to create a list of sources to ingest, and not to ingest any data absent from the list. In a similar manner, another known solution is to create a list of sources to discard, and to ingest everything else. Both of these complementary processes are manually employed. As the list grows, a scaling challenge is encountered. More specifically, it is impossible to manually specify rules for each and every data source as the quantity of data sources increases.

An approach to the solution described above, is to specify a broad coverage of categories to ingest, with the understanding that the ingested content will include undesired content. A complementary approach to this solution is to specify a narrow coverage by explicitly defining sites, at a risk of filtering out potentially useful content. However, both of the described solutions are not desirable since they either introduce more content than desired, with the likelihood that the content will be polluted, or do not allow access to all of the desired content.

Accordingly, there is a need for granular management of a data ingester that functions in an autonomous manner. The modified ingester addresses content to be ingested and/or discarded, while minimizing manual intervention.

SUMMARY OF THE INVENTION

This invention comprises a method and system for managing data content collection by a data ingester through taxonomy based filtering rules.

In one aspect of the invention, a method is provided for managing data content collection. A policy is created around data ingestion requirements. The policy creation includes a listing of content type and setting the policy around the created list. Data ingestion rules are defined based upon the created policy, and the ingested content is ingested and classified in a taxonomy. The classified data is compared against the defined data ingestion rules and automatically assigned to a classification store in the taxonomy based upon the classification.

In another aspect of the invention, a computer system is provided with a processor in communication with storage media. A data ingestion policy is provided, which includes data ingestion requirements and data ingestion rules based upon the data ingestion policy. An ingester is provided to collect data content. A manager is provided in communication with the ingester and classifies the collected content in a taxonomy based upon the created policy, and compares the classified content against the ingestion rules. An assignment tool is provided in communication with the manager to automatically assign the collected content to a classification store in the taxonomy.

In yet another aspect of the invention, an article is provided in the form of a computer readable carrier including computer program instructions configured to manage data content collection. Instructions are provided to create a policy around data ingestion requirements, including creating a listing of content type and setting the policy around the created list. In addition, instructions are provided to define data ingestion rules based upon the created policy, and to classify incoming content in a hierarchy based upon the created policy. Instructions are also provided to compare the classified incoming content against the defined data ingestion rules. Incoming content is automatically assigned to a classification store in the hierarchy based upon the classification.

Other features and advantages of this invention will become apparent from the following detailed description of the presently preferred embodiment of the invention, taken in conjunction with the accompanying drawings.

DESCRIPTION OF THE PREFERRED EMBODIMENT

Figure 1:
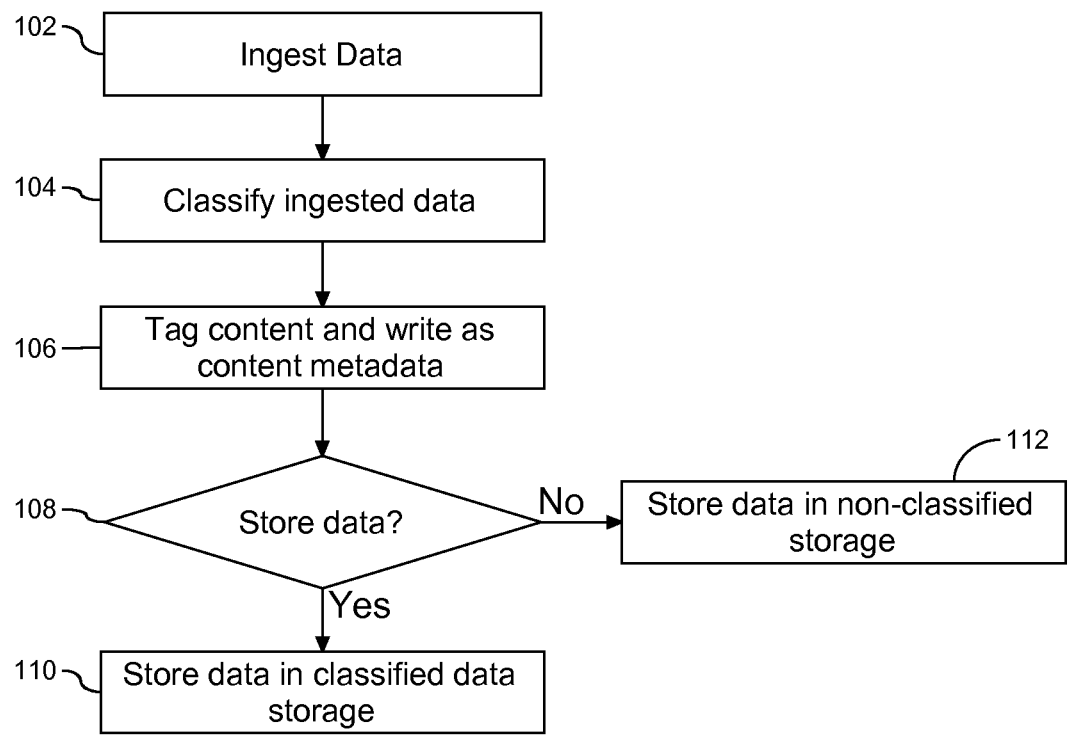
FIG. 1 is a flow chart illustrating data ingestion based upon taxonomy rules.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely be representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiment of the invention will be best understood by reference to the drawings, wherein like parts are designated by like numerals throughout. The following description is intended only by way of example, and simply illustrates certain select embodiments of devices, systems, and processes that are consistent with the invention as claimed herein.

Overview

The method, apparatus, and article of manufacture of the present invention provides valuable advantage over the related art. According to the present invention, a data ingester is provided to collect content from various data sources across a distributed computer network. A policy framework is provided as a structure of requirements associated with the data ingestion. Similarly, rules are provided in compliance with the policy framework. The rules determine data that falls within the ingestion policy and data that is external to the ingestion policy. Data that is considered within the ingestion policy is assigned to a location within the taxonomy, also known as a classification store. Conversely data that is external to the ingestion policy is not assigned to a location within the taxonomy. In one embodiment, the ingester may be dynamically modified during the ingestion process. This enables policy and associated rules to be modified during ingestion of data content by the ingester.

Technical Details

In the following description, reference is made to the accompanying drawings that form a part hereof, and which is shown by way of illustration that specific embodiment in which the invention may be practiced. It is to be understood that other embodiments may be utilized because structural changes may be made without departing from the scope of the present invention.

Taxonomy is a science of classification of data into different categories. In general a taxonomy is composed of units that are arranged frequently in a hierarchical structure. Typically the units in the taxonomy are related by parent-child relationships. In one embodiment, a child in the taxonomy has by definition the same constraints as the parent plus one or more additional constraints. Accordingly, a taxonomy is a hierarchical structure for classifying data.

It is known in the art that data ingesters collect data, and that the collected data is stored in storage media. With respect to a data ingester, it is desirable to classify the data sources based upon the content or a set of selected features associated with the data. Upon classification of content, the site is tagged with an appropriate path based upon a defined taxonomy. The taxonomy allows the features of the content to be abstracted. In one embodiment, taxonomy is utilized together with an ingester to extract subjects of interest in a tree based setting, i.e. a hierarchical structure. Classification of content in a hierarchical manner allows the data to be tagged and assigned a destination based upon its classification. A path is employed to identify the location of the data in the hierarchy based upon the assigned destination.

A taxonomy is created to define the type of content about which the ingestion rules are set. This is known as a rule based taxonomy. In one embodiment, the defined content type includes the content desired and content that is not desired. Once the rule based taxonomy is created, data ingestion rules are defined based on the created taxonomy. The rules are known in the art as ingestion rules. Following the process of defining the data ingestion rules, a classifier is employed to classify incoming content based on the created taxonomy.

FIG. 1 is a flow chart (100) illustrating administration of data ingestion based upon the taxonomy rules and classifier explained above. Initially, data is ingested by the ingester (102), followed by classification of the ingested data (104). After the data content is classified at step (104), the content is tagged and written as part of the content metadata (106). In one embodiment, content metadata is maintained by the ingester. Following classification of the ingested data, it is determined if the ingested data should be stored in data storage (108). Data is not ingested and placed in the data storage prior to application of the ingestion rules. In contrast, ingestion rule and policies are applied by the ingester to the data prior to storage of the data within the taxonomy. In one embodiment, classification of the data is compared with the ingestion rules to determine whether or not the data should be stored. A positive response to the determination at step (108) is followed by storing the ingested data in an appropriately classified section of data storage (110). Conversely, a negative response to the determination at step (108) is followed by storing the ingested data in a non-classified section of data storage (112). In one embodiment, metadata for the data stored in the non-classified section of data storage remains in the ingester, which may revisit the origin of the ingested data after a time interval lapse to determine whether the data content at the point of origin has changed, and if so, if the changed data falls within the ingestion rules. Similarly, in one embodiment, data stored in a classified section of data storage may be considered a first class of data for desired data, and data stored in a non-classified section of data storage may be considered a second class for forbidden or non-desired data. In one embodiment, non-desired data may be data that does not fit within the current taxonomy. Accordingly, based upon defined ingestion rules, data is ingested by an ingester in one or more classified locations in data storage.

Figure 2:
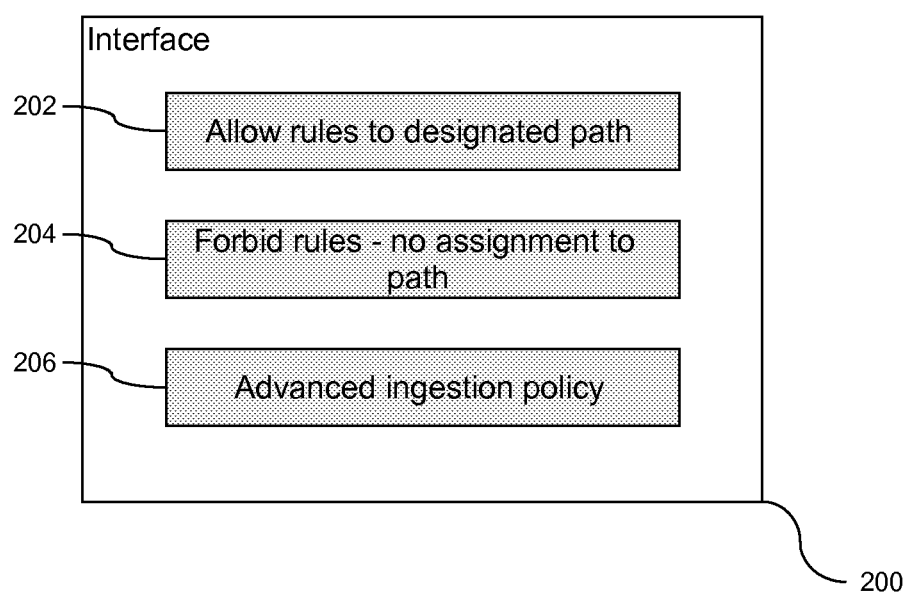
FIG. 2 is a block diagram of an interface for directing data ingestion rules to the ingester.

As noted above, ingestion rules are applied to ingested data to determine where the data should be stored in the classification hierarchy. FIG. 2 is a block diagram (200) of an interface for directing data ingestion rules to the ingester. As shown, the interface illustrates elements of the data ingestion rules that are configurable. More specifically, the interface shows a first selection of rules that supports assignment of ingested data to a designated path (202), and a second selection of rules that do not support assignment of ingested data to at least one path (204). In addition to the first and second selections (202) and (204), respectively, the interface may include a section for setting advanced ingestion policies (206). Advanced settings may include, but are not limited to, a data refresh rate, and a rank boost to prioritize or schedule ingest operations. Accordingly, as shown herein administration and configuration of data ingesters is facilitated through an interface for setting and modifying rules pertaining to ingestion policies.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Figure 3:
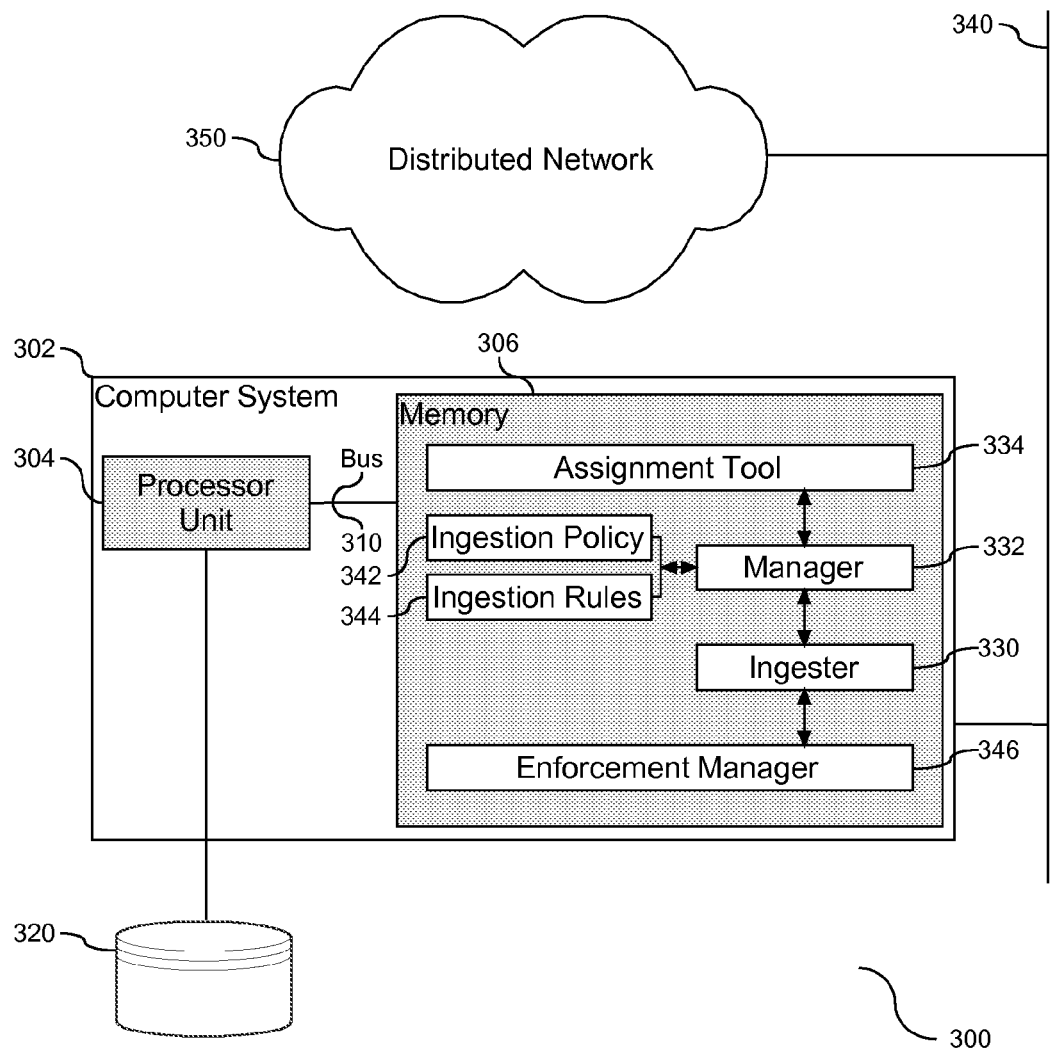
FIG. 3 is a block diagram illustrating placement of an ingester management tool in a computer system according to the preferred embodiment of this invention, and is suggested for printing on the first page of the issued patent.

FIG. 3 is a block diagram (300) illustrating placement of an ingester management tool in a computer system. The illustration shows a computer system (302) with a processor unit (304) coupled to memory (306) by a bus structure (310). Although only one processor unit (304) is shown, in one embodiment, the computer system (302) may include more processor units in an expanded design. The computer system (302) includes data storage (320) in communication with the processor unit (304).

An ingester (330) is provided local to the system to collect data content from a variety of data sources. In one embodiment, the computer system (302) is in communication with a distributed network (350) via a local network connection (340). The ingester may collect data content from a variety of data sources in the distributed network (350). As shown, a manager (332) is provided local to the computer system and in communication with the ingester (320). The manager (332) classifies content collected from the ingester in a hierarchical manner based upon an established data ingestion policy. An assignment tool (334) is provided in communication with the manager (332). The assignment tool (334) automatically assigns data collected from the ingester (330) to a location in the associated taxonomy.

To support the manager (332), the memory (306) includes data ingestion policy (342) that dictates data ingestion requirements to the manager (332), and associated data ingestion rules (344) based upon the data ingestion policy. Furthermore, as explained above, in one embodiment, data ingestion policy(s) are automatically enforced. As shown herein, an enforcement manager (346) is provided in communication with the ingester (330) to automatically enforce the created policy across all data sources and content type.

As shown herein, the ingester (330), manager (332), and assignment tool (334) each reside in memory (306) local to the computer system. In one embodiment, the ingester (330), manager (332), and/or assignment tool (334) may reside as hardware tools external to local memory, or they may be implemented as a combination of hardware and software. Similarly, in one embodiment, the ingester (330), manager (332), and assignment tool (334) may be combined into a single functional item that incorporates the functionality of the separate items. As shown herein, each of the ingester (330), manager (332), and assignment tool (334) are local to the computer system (302). However, in one embodiment they may be collectively or individually distributed across the network and function as a unit to collect, classify, and assign collected data to the taxonomy. Accordingly, the ingester (330), manager (332), and assignment tool (334) may be implemented as software tools, hardware tools, or a combination of software and hardware tools, to collection and organize data content.

EXAMPLE

As noted above, taxonomy is a science of classification of data. In this example, the taxonomy is divided into multiple classes with different levels in the hierarchy. In one embodiment, ingestion rules are defined using a high level taxonomic structure with multiple paths. In this example, the following taxonomic paths are provided:

```
/useful/people/politician/us/bush
/useful/people/politician/us/Clinton
/useful/people/politician/uk/blair
/junk/spam/
/junk/ads/
```

In a graphical representation the above taxonomic paths are illustrated as:

```
- useful
    -people
        -politician
            -us
                -bush
                -clinton
            -uk
                -blair
- junk
    - spam
    -ads
```

During the process of data ingestion based upon classification of content, the data is tagged with the appropriate path in the hierarchical structure to identify the appropriate storage location. For example, all content pertaining to Prime Minister Tony Blair of the UK is tagged as follows: "/useful/people/politician/uk/blair". Similarly, all content that relates to a politician from the UK and does not pertain to Tony Blair is tagged as follows: "/useful/people/politician/uk/". Accordingly, the taxonomic structure together with administrator defined ingestion rules supports abstraction of data based upon content Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages of the Exemplary Embodiment Over the Related Art

A taxonomy and data ingestion rules are employed to function in conjunction with a data ingester. The taxonomy and rules function to classify the data prior to storage of the data, i.e. ingestion of the data. The classified data is stored in a location in the taxonomy based upon the classification. As such, the ingestion rules are applied by the ingester to the data prior to storage of the data. The rules may be modified during operation of the ingester. More specifically, an interface is provided as a tool to facilitate administration and configuration of the data ingester and the associated rules and policies. The ingester continues ingesting data, and applies modified rules to the ingestion process. The data ingestion rules, together with the taxonomy and interface, mitigate manual intervention with the ingester due to changes in policy and/or data sources. Accordingly, the data ingester pertains to analysis of data from a large distributed computing network and is not specific to media content.

Alternative Embodiments

It will be appreciated that, although specific embodiments of the invention have been described herein for purposes of illustration, various modifications may be made without departing from the spirit and scope of the invention. In particular, the ingester may be modified during operation. For example, in one embodiment new ingestion rules may be employed or existing rules modified during operation of the ingester. In one embodiment extensible markup language may be employed for configuration of the ingester and the associated ingestion rules. Configuration changes may be employed via modification to an associated extensible markup language (XML) document as new techniques become available. Such configuration includes, but is not limited to, frequency of ingestion, and modifications to the taxonomy. Similarly, in one embodiment grammar is employed with the XML to provide precise description of a language or specification. Examples of such grammar include, but are not limited to, context free grammar (CFG) and Backus-Naur Form (BNF). CFG is used to generate rules in formal language theory, and BNF is used to generate notation for programming languages, instruction sets, and specifications. Accordingly, the scope of protection of this invention is limited only by the following claims and their equivalents.

We claim:

1. A method for managing data content collection, comprising:

creating, by a processor, a listing of content type and setting a policy associated with the created list;

defining one or more data ingestion rules in the form of a path hierarchy based upon the created policy, including a first selection of a first rule supporting assignment of ingested data to a designated path and a second selection of a second rule forbidding assignment of ingested data to at least one path;

ingesting incoming content over a network in communication with the processor, including dynamically modifying the policy and one of the rules during the ingestion of incoming content;

classifying the ingested incoming content, responsive to any modified policy and rule, in a hierarchical manner within a taxonomy based upon the created policy;

comparing the classified incoming content against the defined one or more data ingestion rules, including determining a storage location for the incoming content; and storing the incoming content into a data storage divided into a first data storage within the taxonomy and a second data storage external to the taxonomy, including automatically assigning the incoming content to a location in the first data storage if the content is within the policy, otherwise assigning the incoming content to a location in the second data storage.

2. The method of claim 1, further comprising automatically enforcing the created policy across all data sources and content type.

3. The method of claim 1, wherein the step of classifying incoming content includes tagging the content and writing the tag as part of content metadata.

4. The method of claim 1, wherein the location includes a first class for desired data and a second class for forbidden data.

5. The method of claim 4, further comprising reviewing the forbidden data and classifying the forbidden data to desired data subject to a change selected from the group consisting of: content and reclassification of incoming content.

6. The method of claim 1, further comprising providing an interface for generating policy rules for the ingester.

7. A computer system, comprising:

a processor in communication with storage media;

data ingestion policy, including data ingestion requirements;

data ingestion rules in the form of a path hierarchy based upon the data ingestion policy, including a first selection of a first rule supporting assignment of ingested data to a designated path and a second selection of a second rule forbidding assignment of ingested data to at least one path;

an ingester to collect data content including dynamically modifying the policy and the rules during the ingestion of incoming content;

a manager to classify the ingested incoming content, responsive to any modified policy and rule, in a hierarchical manner within a taxonomy based upon the created policy, and to compare the classified content against the one or more ingestion rules including determining a storage location for the incoming content; and the manager to store the incoming content into a data storage divided into a first data storage and a second data storage including an assignment tool in communication with the manager to automatically assign the incoming content to a location in the first data storage within the taxonomy if the content is within the policy, otherwise to assign the incoming content to a location in the second data storage.

8. The system of claim 7, further comprising an enforcement manager in communication with the ingester to automatically enforce the created policy across all data sources and content type.

9. The system of claim 7, wherein the manager is further configured to tag the incoming content and write the tag as part of content metadata.

10. The system of claim 7, wherein the location in the taxonomy includes a first class in data storage for desired content and a second class in data storage for undesired content.

11. The system of claim 10, further comprising a content review tool to review the undesired content and classified the undesired content to desired content following a change associated with the content, wherein the change is selected from the group consisting of: content, and classification of incoming content.

12. The system of claim 7, further comprising an interface to direct policy rules for the ingester.

13. An article configured to automatically assign incoming content to a location in an associated taxonomy based upon classification, the article comprising:
- a non-transitory computer readable medium including computer program instructions configured to manage data content collection, the instructions comprising:
  - instructions to create a policy associated with data ingestion requirements, including creating a listing of content type and setting the policy around the created list;
  - instructions to define one or more data ingestion rules in the form of a path hierarchy based upon the created policy, including a first selection of a first rule supporting assignment of ingested data to a designated path and a second selection of a second rule forbidding assignment of ingested data to at least one path;
  - instructions to classify incoming content in a hierarchical manner within a taxonomy based upon the created policy;
  - instructions to compare the classified incoming content against the one or more defined data ingestion rules, including dynamically modifying the policy and the rules during the ingestion of the incoming content; and
  - instructions to store the incoming ingested content into a data storage divided into a first data storage and a second data storage including automatic assignment of the incoming content to a location in the first data storage if the content is within the policy, otherwise assignment of the collected content to a location in the second data storage.

14. The article of claim 13, further comprising instructions to automatically enforce the created policy across all data sources and content type.

15. The article of claim 13, wherein the instructions to classify incoming content includes instructions to tag the content and write the tag as part of content metadata.

16. The article of claim 13, wherein the location in the taxonomy includes a first class for desired data and a second class for forbidden data.

17. The article of claim 16, further comprising instructions to review the forbidden data and classify the forbidden data to desired data subject to a change selected from the group consisting of: content and reclassification of incoming content.

18. The article of claim 13, further comprising instructions to provide an interface to generate policy rules for the ingester.

* * * * *